United States Patent Office 2,871,138
Patented Jan. 27, 1959

2,871,138

ZIRCONIUM COMPOSITIONS AND PROCESS OF MAKING

Robert H. Linnell, Blawenburg, N. J., assignor to Titanium Zirconium Company, Inc., a corporation of New Jersey No Drawing. Application January 16, 1957
Serial No. 634,425

6 Claims. (Cl. 106—299)

This invention relates to processing zircon and to products therefrom.

Zircon, the ore that is the common source of zirconium and its compounds, contains zirconia combined with silica in the form of zirconium silicate. The silicate may be written $ZrO_2.SiO_2$ or $ZrSiO_4$.

The invention is particularly useful in making ceramic colors and an intermediate therefor and also in the manufacture of catalysts. It will, therefore, be illustrated by description in connection with such uses.

For making zirconium compounds, there is an electrical furnace and also a chemical process. The chemical process, to which the invention relates particularly, comprises heating zircon ore with soda ash or the like, to give an acid soluble double silicate of zirconium and the alkali metal. The next step involves treating the reaction product of the heating, after cooling, with water and sulfuric acid, the product being ordinarily slurried with the water before the acid is introduced. The amount of sulfuric acid used is that required not only to correspond to the alkali originally used but also to dissolve the zirconium as zirconium sulfate. This leaves the silica from the silicate in the form of silica gel. The subsequent separation of both the sulfate of the alkali used and the zirconium sulfate from the silica gel is very inconvenient and difficult on a commercial scale; the operation requires washing out soluble materials from the silica gel which suggests a gelatine dessert in set condition although my gels are ordinarily somewhat firmer and more crumbly after exposure to air. Because of the tediousness of this process, it is conventional practice in the manufacture of zirconia ceramic colors, for example, to use a technical grade of electric process zirconia. This zirconia is mixed with flint or other form of finely divided crystalline silica, vanadium oxide, and ordinarily also a flux such as sodium fluoride. This mixture is then calcined at appropriate temperatures to develop a pleasing blue product suitable for use as the color for ceramic objects, all as described in the literature.

I have now discovered that I can make an intermediate for such zirconium oxide color manufacture without the separation of the zirconium from the silica gel. The process is thus simplified. In addition, the intermediate so made is more desirable in making the color than the previously used zirconia.

In the manufacture of silica-zirconia catalyst, I also shorten the manufacturing procedure and I preserve effectiveness of the product.

Briefly stated, my invention comprises the herein described process in its various embodiments and the new products thereof. More specifically, the invention comprises dissolving the reaction product of zirconium ore and alkali metal alkali, after cooling, in a mineral acid in amount to correspond approximately only to the alkali initially used and to cause the resulting zirconia and silica to appear in a cogelled form. The invention comprises also processing the cogel so formed as by subdividing it, either mechanically or by drying or both, and then washing the subdivided material with water to dissolve out the sulfate of the alkali metal used.

Another embodiment of the invention includes calcining and washing the said cogel, the washing being effected either before or after calcination or both and the calcination being made at a temperature to cause substantially complete dehydration of the hydrated zirconia and silica constituting the cogel. For best results in making ceramic coloring material, the calcination is carried out at a temperature below that at which the monoclinic form of zirconia is transformed to the cubic.

A modification of the invention includes neutralizing the alkalinity of the fusion product with the acid in amount adequate also to convert the zirconium to the form of a salt of the acid, the acid being used in such concentration that the product of the reaction is practically anhydrous at the completion of the acid reaction, so that formation of the hydrous gels is thereby avoided, and the zirconium sulfate so made being separated from the silica by solution of the former in water and separation of the resulting solution, as by filtration, before silica gel forms in quantity to be objectionable.

The invention includes in addition the intimate mixture of zirconia and amorphous silica that is particularly reactive in making the ceramic colors described and also the anhydrous mixture of zirconium sulfate and silica that results from the use of the concentrated acid.

As to materials used there is no advantage in using any other ore of zirconium than zircon and the process gives with this ore in fact advantages not realized with any other source of zirconium known to me.

The alkali used in the original fusion product is an alkali metal alkali. Examples of such alkalies that I use are sodium carbonate and sodium hydroxide. Other alkali metal alkalies such as potassium carbonate or hydroxide are both more expensive and unnecessary.

The acid used to neutralize the original alkalinity, after its reaction with the ore to form the double silicate, is an inexpensive mineral acid. Sulfuric acid is the one that is ordinarily used by me. Hydrochloric or nitric acid may be used in equivalent proportions but less conveniently. Phosphoric acid may be used for some purposes. Mixtures of the several acids may also be used. In the reaction of the said reaction product with concentrated or substantially anhydrous acid, sulfuric acid is the only one recommended. For this purpose it is ordinarily introduced in concentration of about 66° Bé or higher up to and including oleum (fuming sulfuric acid).

Vanadium pentoxide, this term including a source thereof such as ammonium metavanadate, is a satisfactory material for supplying the vanadium component in the manufacture of the ceramic color.

In making such color I use also a fusible alkali metal halide flux such as sodium fluoride, sodium chloride, or the corresponding potassium salts. Any flux conventionally used in making a coloring material of zirconia, silica, and vanadium pentoxide is satisfactory.

The proportion of the flux may be any that is usual in making such ceramic colors, as for instance, 0.5–3 parts of the flux for 100 of the mixed dried and calcined combination of zirconia and silica.

Proportions of the vanadium oxide, on the other hand, are made substantially less than conventional for a given intensity of color desired. Thus I obtain good blue colors with 0.8–1.8 parts of vanadium pentoxide for 100 of my combination of zirconia and amorphous silica. Higher proportions of vanadium pentoxide give color intensities stronger than desired in most cases.

As to the conditions of operation, the heating is made in usual manner and at temperatures and for periods of time that are conventional in this art.

For dehydration, I heat the mixture of hydrated zirconia and amorphous silica previous to use in color manufacture, to a temperature adequate to cause dehydration of the zirconia and silica but below the transition point of monoclinic zirconia to cubic, that is, below about 1000° C. Satisfactory and safe temperatures are 750°–950° C.

The invention will be further illustrated by description in connection with the following specific examples of the practice of it. In these examples and elsewhere herein, proportions are expressed as parts by weight on the dry basis unless specifically stated to the contrary.

*Example 1*

Zirconia and silica cogel is first made as follows:

A mixture of 397 parts of finely milled zircon ore and 278 parts of soda ash (corresponding to approximately 1.25 moles of sodium oxide for 1 mole of zirconia) was heated at about 1000° C., that is calcined, until reaction was essentially complete. In the product 97% of the original zirconium is acid soluble, the original content of the ore, calculated as $ZrO_2$, being 65%.

The chemical reaction with the limited proportion of soda ash used (namely 1 mole plus the reasonable excess shown, to allow for possible incompleteness of reaction) may be written as follows:

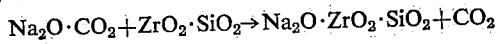

or

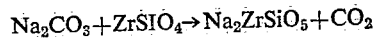

70 parts of the reaction product, sometimes referred to less correctly as fusion product, was slurried with 125 parts of water. 35.7 parts of 66° Bé. sulfuric acid were then added, the temperature being kept below 45° C. After the acid addition, the slurry was continuously agitated until, after 15 minutes, the slurry set to a milk white gel. The zirconium and silicon in the gel are considered to be their hydrated oxides. The zirconia corresponds to about 65% of the dry weight of the two oxides.

The following are modifications of the acid treatment. (a) 600 parts of the said reaction product were slurried with 700 parts of water and then stirred with 676 parts of 20° Bé. hydrochloric acid. After the acid addition, the slurry set to a yellow gel. (b) 200 parts of the said reaction product were slurried with 200 parts of water and 175.8 parts of 42.3 Bé. nitric acid were added. After the acid addition, the slurry set to a milk white gel. (c) 100 parts of the same reaction product were slurried with 250 parts of water and 56 parts of 85% phosphoric acid were then added. After some time the slurry set up to a white gel. (d) 200 parts of zircon and soda ash reaction product were slurried with 300 parts of water and a mixture consisting of 102 parts of 66° Bé. sulfuric acid and 112 parts of 85° phosphoric acid were then added. The product set to a soft white gel. Products made with phosphoric acid are useful as catalysts and ion exchangers.

In all these procedures of Example 1 except those using phosphoric acid, the proportion of acid used was approximately stoichiometric to the alkali (soda ash) used, so as to neutralize the alkali but dissolve substantially none of the zirconia.

In one use of the gel products so made without using phosphoric acid, they were cooled and dried, as in air, and crumbled to soft, white, granules. These were then heated to 800° C. until dehydrated. The dehydrated product was washed with water until the washings were substantially free of sodium and sulfate. The washed powder was dried at 110° C.

The resulting zirconia-amorphous silica composite contains the zirconia largely (i. e. 75% or more of the total) in monoclinic form. The composite is superior to the usual zirconia and silica mix in making ceramic colors. As compared to the zirconia that, in previous practice has been refined away from the silica of the zircon ore and then mixed with crystalline silica, my less expensive mix, with the original silica in amorphous form, gives a deeper blue color, in the heating with vanadium pentoxide and sodium fluoride. In representative runs, I obtain a stronger color with 1.4% of the expensive vanadium oxide (on the weight of the $ZrO_2$ and $SiO_2$) than with 4% in a conventional mix. This saving in vanadium oxide alone represents several cents a pound on the cost of the color.

In another modification, the washing precedes calcination. The gel product was air dried and crumbled to a soft, white granular product. It was then washed with water until the washings were substantially sodium and sulfate free. The washed product was then dehydrated by heating to about 800° C. A further purification may be accomplished by washing the calcined product. The product is useful as above in coloring ceramic articles, the technique of use being conventional.

*Example 2*

Silica extension, to lower the proportion of the relatively costly zirconia to a level satisfactory for certain uses, is effected as follows:

100 parts of the product of the reaction of the soda ash with the zircon ore of Example 1 were slurried with 160 parts of water and 280 parts of sodium silicate (3.22$SiO_2$:1$Na_2O$), 41° Bé. and 110 parts of 66° Bé. sulfuric acid were then admixed. The gel so formed contains the silica of the zircon ore and also that of the sodium silicate.

The thus extended gel is washed and dried as described for the gel in Example 1. However, the final temperature of drying may be and suitably is reduced somewhat below that of complete dehydration as, for instance, to about 300°–700° C., a suitable temperature range for most catalytic uses being 500°–600° C.

There is thus formed a product containing an increased proportion of silica to zirconium over that present in the ore or as made in Example 1. By varying the proportion of the sodium silicate and the amount of acid correspondingly, products are made containing 35–95 parts of silica to 100 of $ZrO_2$ plus $SiO_2$.

*Example 3*

In this example, the procedure of Example 1 is followed, except that the product of the reaction of the soda ash with the zircon ore is cooled and then washed with water to remove water solubles (excess alkali, etc.) before the acidification. Thus 4200 parts of the reaction product of Example 1 were slurried with 12,000 parts of water and the liquid was removed by decantation. The decanting was repeated 3 times and the final slurry treated with 1,765 parts of 66° Bé. sulfuric acid. The resulting gel was dried at 120° C., washed with water to remove most of the sulfate, dehydrated at 850° C., and then rewashed to substantially sulfate free condition and finally dried at 120° C.

To make a color, 47 parts of this product were mixed with 1.35 parts of sodium fluoride and 0.7 part of vanadium pentoxide and fired 2 hours at 830° C. The resulting soft cake was disintegrated. It is then a strong blue colored powder, useful in making pleasing blue ceramic tiles and other ceramic objects.

*Example 4*

Here I make zirconium sulfate without forming the silica gel and without the attendant difficulty of separating the sulfate from the gel.

200 parts of the product of the reaction of the soda ash with zircon ore of Example 1 were intimately mixed with 265 parts of 66° Bé. sulfuric acid. This large excess of acid corresponds to the alkali present and provides 2$H_2SO_4$ for 1$ZrO_2$. The reaction gave a white powder containing mixed sodium sulfate, zirconium sulfate and silica powder which is useful in leather tanning.

For preparing zirconium compounds, the zirconium present is extracted by prompt leaching with water, the extraction being simplified since the silica present is not gelatinized at once by the addition of water. The solution is filtered from the silica promptly, before the silica has time to form a gel to an objectionable extent.

In one procedure with the concentrated acid, the mix was thinned with a non-solvent organic liquid before the acid was added.

100 parts of the product of the reaction of the soda ash with the zircon ore of Example 1 were slurried in 180 parts of Stoddard solvent which had previously been purified by shaking with 66° Bé. sulfuric acid. To this organic solvent-fusion product slurry were added 135 parts of 66° Bé. sulfuric acid. After the reaction was complete the mixture was extracted by agitation with water, settled, the solvent recovered by draining off the upper of the two resulting layers, and the water layer filtered to separate the silica from the solution of zirconium sulfate.

Other organic solvents that may be used are toluene, xylene, and kerosene.

*Example 5*

The procedure of any of either Examples 1, 2, or 3 is followed except that the sulfuric acid there used is replaced by an equivalent proportion of any of the other acids disclosed, provided phosphoric acid is not used when the product is to be utilized in making a pigment.

*Example 6*

The procedure of any of the Examples 1–4 is followed except that the soda ash there used in the original reaction with the ore is replaced by an equimolecular proportion of any of the other alkalies listed earlier herein.

It is to be understood that it is intended to cover all changes and modifications of the examples of the invention herein chosen for the purpose of illustration which do not constitute departures from the spirit and scope of the invention.

What is claimed is:

1. In treating an ore containing zirconia and silica in the form of a zirconium silicate by the process which includes calcining an intimate mixture of the dry ore with dry soda ash in the proportion of about 1.25 moles for 1 mole of the zirconia, continuing the calcining until reaction between the ore and soda ash is substantially complete to give an acid soluble sodium and zirconium double silicate, and mixing the resulting product with a mineral acid, the improvement which comprises introducing the mineral acid in amount approximately stoichiometric only to the soda ash used, the acid in this amount converting substantially all the sodium of the original soda ash to the sodium salt of the acid and substantially all the zirconium and silicon originally present in the ore to their insoluble oxides in the form of a cogel mixed with the said sodium salt.

2. The process of claim 1 in which the said acid is sulfuric.

3. The process of claim 1 which further comprises heating the said water insoluble oxides constituting the final cogel product of claim 1 at a temperature of dehydration thereof and below the transition point of the zirconium oxide to cubic form and at a temperature within the range about 750°–1000° C. until the zirconium and silicon oxides of the cogel are substantially completely dehydrated, cooling the dehydrated product, washing the dehydrated and cooled material with water to remove the said sodium salt and drying the washed material.

4. In treating zircon ore including zirconium and silicon in the form of zirconium silicate, the process which comprises calcining an intimate mixture of the dry ore with dry sodium carbonate in amount approximately equal to that required to convert substantially all of the zirconium and silicon to acid soluble double silicate of sodium and zirconium, continuing the calcining until reaction between the ore and the sodium carbonate is substantially complete to give the said double silicate, mixing the resulting double silicate in dry condition with sulfuric acid of concentration within the range approximately 66° Bé. up to and including fuming sulfuric acid and in amount at least approximately equivalent stoichiometrically to the double silicate so as to convert the double silicate substantially completely to a combination of zirconium sulfate, sodium sulfate, and silica in non-gelatinous form, and maintaining the resulting mixture at an elevated temperature to cause vaporization of any water present until the resulting mixture becomes substantially dry.

5. In making a color, the process which comprises mixing 100 parts of the dry cogel of zirconium and silicon oxides constituting the final product of claim 3 with 0.3–5 parts of alkali metal halide flux and about 0.8–1.8 parts of vanadium pentoxide, heating the resulting mixture at a temperature causing the production of a blue color and at all times at a temperature below about 1000° C., whereby the transition of the zirconium oxide to cubic form is avoided.

6. A composition of matter comprising an intimate combination of zirconia predominantly in monoclinic form and amorphous silica, the zirconia and silica being in coprecipitated, water washed, and codried condition and being the product of the process of claim 3.

References Cited in the file of this patent

UNITED STATES PATENTS

| | | |
|---|---|---|
| 2,099,019 | Kinzie | Nov. 16, 1937 |
| 2,315,520 | Hake | Apr. 6, 1943 |
| 2,453,740 | Becker | Nov. 16, 1948 |
| 2,456,721 | Millikan et al. | Dec. 21, 1948 |
| 2,477,638 | Millikan | Aug. 2, 1949 |
| 2,481,493 | Blue | Sept. 13, 1949 |
| 2,564,522 | Rohden | Aug. 14, 1951 |
| 2,597,889 | Millikan et al. | May 27, 1952 |
| 2,764,558 | Heard | Sept. 25, 1956 |

FOREIGN PATENTS

| | | |
|---|---|---|
| 384,473 | Great Britain | Dec. 8, 1932 |
| 562,620 | Great Britain | July 10, 1944 |
| 625,448 | Great Britain | June 28, 1949 |